United States Patent
Morreale

(10) Patent No.: US 11,441,439 B2
(45) Date of Patent: Sep. 13, 2022

(54) LUBRICATED ENCLOSURE FOR AN AIRCRAFT TURBINE ENGINE, LIMITING THE RETENTION OF LUBRICANT DURING PITCHING

(71) Applicant: SAFRAN AIRCRAFT ENGINES, Paris (FR)

(72) Inventor: Serge Rene Morreale, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 802 days.

(21) Appl. No.: 16/336,263

(22) PCT Filed: Sep. 27, 2017

(86) PCT No.: PCT/FR2017/052599
§ 371 (c)(1),
(2) Date: Mar. 25, 2019

(87) PCT Pub. No.: WO2018/060595
PCT Pub. Date: Apr. 5, 2018

(65) Prior Publication Data
US 2019/0211875 A1  Jul. 11, 2019

(30) Foreign Application Priority Data

Sep. 29, 2016 (FR) ..................... 16 59350

(51) Int. Cl.
*F01D 9/06* (2006.01)
*F01D 25/16* (2006.01)
(Continued)

(52) U.S. Cl.
CPC ............. *F01D 9/065* (2013.01); *F01D 25/16* (2013.01); *F01D 25/18* (2013.01); *F02C 7/06* (2013.01);
(Continued)

(58) Field of Classification Search
CPC .......... F01D 9/065; F01D 25/18; F01D 25/16; F02C 7/06; F16N 31/00; F16N 2210/02;
(Continued)

(56) References Cited

U.S. PATENT DOCUMENTS 4,344,506 A * 8/1982 Smith ..................... F16C 19/54
60/39.08
5,749,660 A * 5/1998 Dusserre-Telmon ........................
F16C 19/166
384/475

(Continued)

FOREIGN PATENT DOCUMENTS

EP  1 681 480 A2  7/2006
EP  1 936 123 A2  6/2008
(Continued)

OTHER PUBLICATIONS

U.S. Appl. No. 15/923,968, filed Mar. 16, 2018, U.S. Pat. No. 2018/0202303 A1, Morreale, Serge Rene, et al.*

(Continued)

*Primary Examiner* — Igor Kershteyn
(74) *Attorney, Agent, or Firm* — Oblon, McClelland, Maier & Neustadt, L.L.P.

(57) ABSTRACT

A lubricated enclosure for an aircraft turbine engine, including a drained roller bearing provided with drainage orifices, as well as a lubricant ejector intended to limit the retention of lubricant in a critical zone of the enclosure, the ejector being intended to be passed through by a primary lubricant flow in order to drive a secondary lubricant flow located around a nozzle of the ejector housed in the critical zone of the enclosure. The enclosure includes a device for establishing communication between the drainage orifices and the (Continued)

ejector, such that the lubricant that escapes from the drainage orifices supplies the ejector in order to form the primary flow.

11 Claims, 4 Drawing Sheets

(51) Int. Cl.
*F01D 25/18* (2006.01)
*F02C 7/06* (2006.01)
*F16N 31/00* (2006.01)
*F16C 33/66* (2006.01)

(52) U.S. Cl.
CPC .......... *F16C 33/6685* (2013.01); *F16N 31/00* (2013.01); *F05D 2220/32* (2013.01); *F05D 2260/601* (2013.01); *F16C 2326/43* (2013.01); *F16C 2360/23* (2013.01); *F16N 2210/02* (2013.01); *Y02T 50/60* (2013.01)

(58) Field of Classification Search
CPC .............. F16C 33/6685; F16C 2360/23; F05D 2220/32; F05D 2260/601; Y02T 50/60
See application file for complete search history.

(56) References Cited

U.S. PATENT DOCUMENTS

| | | | |
|---|---|---|---|
| 7,878,303 B2* | 2/2011 | Munson | F02C 7/06 384/473 |
| 2005/0132710 A1* | 6/2005 | Peters | F01D 25/18 60/772 |
| 2005/0217272 A1* | 10/2005 | Sheridan | F04D 29/063 60/39.08 |
| 2006/0159378 A1* | 7/2006 | Plona | F16C 33/58 384/462 |
| 2008/0134657 A1* | 6/2008 | DiBenedetto | F01D 9/065 60/39.08 |
| 2019/0211875 A1* | 7/2019 | Morreale | F02C 7/06 |

FOREIGN PATENT DOCUMENTS

| | | |
|---|---|---|
| FR | 2 740 187 A1 | 4/1997 |
| GB | 2 043 799 A | 10/1980 |
| JP | 2005-106108 A | 4/2005 |

OTHER PUBLICATIONS

International Search Report dated Dec. 12, 2017 in PCT/FR2017/052599 filed on Sep. 27, 2017.
French Preliminary Search Report dated Jun. 9, 2017 in French Application 16 59350 filed on Sep. 29, 2016.

* cited by examiner

LUBRICATED ENCLOSURE FOR AN AIRCRAFT TURBINE ENGINE, LIMITING THE RETENTION OF LUBRICANT DURING PITCHING

TECHNICAL FIELD

The present invention relates to the field of aircraft turbine engines, and more particularly to the design of their lubricated enclosures containing rolling bearings.

STATE OF THE PRIOR ART

Usually, the lubricated enclosures of a turbine engine each contain one or more rolling bearing(s), in order to ensure their lubrication. These are generally drained bearings, as known from document FR 2 740 187. One of the enclosures can also house a reducer for driving the fan, for example in the case of a UHBR ("Ultra High By-pass Ratio") type turbine engine.

A lubricated enclosure is conventionally continuously supplied with oil, which, after having lubricated and cooled the sensitive members located in the enclosure, is extracted by gravity at a low point thereof. After its extraction, the oil progresses by gravity through a radial arm of recovering the lubricant passing through a primary flow path of the turbine engine, this arm being arranged in a 6 o'clock time position. Then, a recovery tube conducts the oil in the circuit so that it can be reinjected into the enclosure after having been cooled.

In the cruise phase, the longitudinal axis of the enclosure and of the turbine engine is substantially horizontal, so that the pitch angle is very low or even zero. The oil can be easily discharged by gravity, outside the lubricated enclosure. On the other hand, some flight phases of the aircraft lead the turbine engine to tilt at a pitch angle, especially during the take-off phase during which the aircraft noses up.

Because of this inclination, a critical area in which the oil is retained can be formed in the enclosure, without being able to escape by gravity in the direction of the radial recovery arm. In other words, when the turbine engine tilts, a kind of bowl, in which part of the oil is trapped, is formed within the lubricated enclosure. When filled, this critical area can remain tolerable if the oil does not reach the rotating elements. However, the increase in the pitch angle leads to an increased risk that the trapped oil reaches the rotating elements, as well as other sensitive elements such as a segmented radial seal, a labyrinth seal, or a brush seal.

To address this problem, it has been proposed to implant an oil ejector in the critical area of the lubricated enclosure, in order to reduce the volume of trapped oil. This ejector, also known as "jet pump", operates by being supplied by a dedicated primary lubricant flow. In a known manner, the crossing of this primary flow in the ejector drives, by suction, a secondary lubricant flow located around the nozzle of the ejector. The secondary flow is thus sucked into the nozzle before being expelled therefrom, with the primary lubricant flow.

However, the implementation of an oil circuit dedicated to the operation of the ejector complicates the design of the enclosure and its surrounding elements, and proves to be costly in terms of mass, especially in that it requires oversizing the tank, the pump, the exchanger and the filters of the oil system.

DISCLOSURE OF THE INVENTION

The object of the invention is therefore to propose a solution addressing at least partially the above-mentioned problems encountered in the solutions of the prior art.

To this end, the invention firstly relates to a lubricated enclosure for an aircraft turbine engine, the enclosure comprising a drained rolling bearing provided with drainage holes, and a lubricant ejector intended to limit the retention of lubricant in a critical area of the enclosure, said ejector being intended to be traversed by a primary lubricant flow in order to drive a secondary lubricant flow located around a nozzle of the ejector housed in said critical area of the enclosure.

According to the invention, the enclosure comprises a device for communicating the drainage holes with the ejector, so that the lubricant escaping from the drainage holes supplies the ejector in order to form the primary flow.

The invention is thus remarkable in that it provides for using the highly-pressurized lubricant leaving the drainage holes in order to supply the ejector present in the lubricated enclosure. This is an additional function fulfilled by the lubricant, in addition to the function of lubricating and cooling the elements of the enclosure. Consequently, the operation of the ejector no longer requires a dedicated oil circuit, which advantageously implies a simplification in the design of the assembly, as well as a reduction in mass.

The invention furthermore provides at least any one of the following optional characteristics, taken alone or in combination.

The communication device is an annular lubricant manifold arranged around an outer ring of the rolling bearing, the manifold comprising a groove closed by the outer surface of the outer ring and into which the drainage holes open, said manifold also comprising at least one lubricant collection duct extending from the groove, said collection duct communicating with a primary flow inlet provided on the ejector, this duct being preferably arranged in a 6 o'clock time position.

Preferably, the manifold is integrated with a rolling bearing support, carrying the outer ring of the bearing.

Preferably, the rolling bearing support is traversed by a lubricant discharge passage arranged opposite the nozzle of the ejector.

Preferably, the bearing support defines a radial recess in which the ejector is housed.

Preferably, the ejector comprises a generally U-shaped primary duct the primary flow inlet of which is opposite the lubricant collection duct, and an outlet of which is opposite the lubricant discharge passage. Preferably, the bearing support also carries another bearing, preferably a roller bearing.

Nevertheless, the bearing support could carry only the drained bearing, without departing from the scope of the invention.

In this respect, it is stated that the invention is particularly interesting when the enclosure includes, in the downstream portion or even in the vicinity of the downstream end of this enclosure, elements that need to be lubricated such as the roller bearing or a segmented radial seal. The presence of these elements generally results in a form of enclosure promoting the retention of oil, and when the turbine engine has a noise-up attitude, it results in a risk of immersion of these elements in the oil.

The lubricated enclosure preferably comprises a lubricant discharge duct extending from the ejector, said duct opening opposite a radial arm of recovering the lubricant passing through a primary flow path of the turbine engine and arranged in a 6 o'clock time position.

Finally, the critical area of the enclosure corresponds to a lubricant retention area formed when the turbine engine is inclined at a pitch angle, said critical area being centered in a 6 o'clock time position.

The invention also relates to an aircraft turbine engine comprising at least one such lubricated enclosure, the turbine engine being preferably of the type comprising a fan driven by a reducer.

Other advantages and characteristics of the invention will become apparent in the non-limiting description detailed hereinafter.

SHORT DESCRIPTION OF THE DRAWINGS

This description will be made with reference to the appended drawings among which;

DETAILED DISCLOSURE OF PREFERRED EMBODIMENTS

Figure 1:
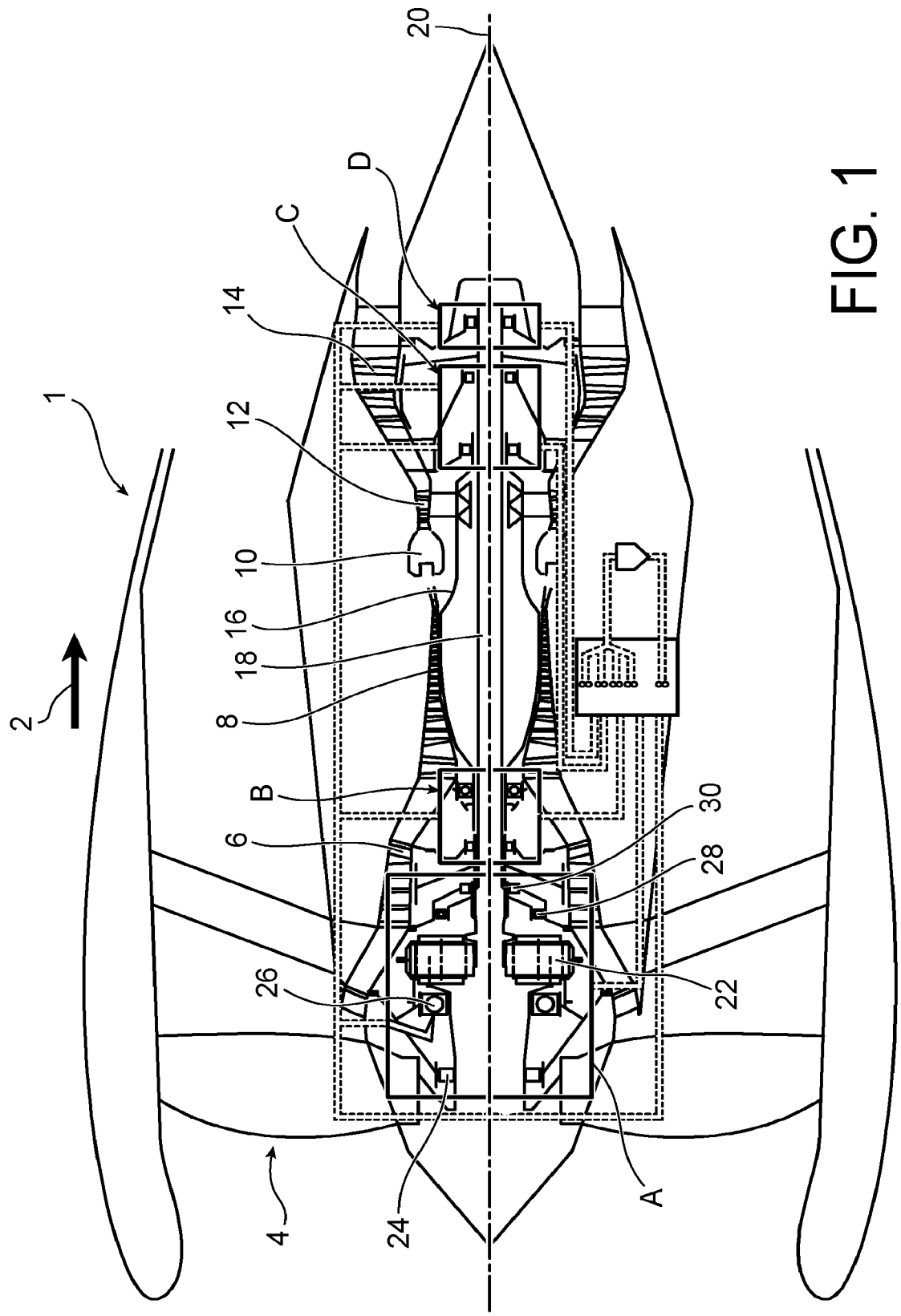
FIG. 1 represents a schematic longitudinal sectional view of an aircraft turbine engine according to the invention.

Referring firstly to FIG. 1, there is represented an aircraft turbine engine 1 according to the invention. It is a UHBR-type turbine engine, because it has indeed a very high dilution rate. It is therefore a by-pass and twin-spool turbine engine, having successively, from upstream to downstream in a main flowing direction 2 of the flows within the turbine engine, a fan 4, a low-pressure compressor 6, a high-pressure compressor 8, a combustion enclosure 10, a high-pressure turbine 12, and a low-pressure turbine 14. The high-pressure turbine and the high-pressure compressor are connected by a high-pressure shaft 16, while the low-pressure turbine and the low-pressure compressor are connected by a low-pressure shaft 18, all of these elements being centered on the longitudinal axis 20 of the turbine engine.

In this type of turbine engine, the low-pressure shaft 18 does not directly drive the fan 4, but a reducer 22 is arranged therebetween. This makes it possible to turn the fan at a rotational speed smaller than that of the low-pressure shaft 18.

In the turbine engine 1, there are provided several lubricated enclosures referenced successively, from upstream to downstream, A, B, C, D. The lubricated enclosure A, of annular shape and located upstream of the turbine engine, contains several rolling bearings, as well as the reducer 22 driving the fan. At the front of the reducer, the enclosure A contains two rolling bearings 24, 26 supporting the fan 4 in rotation. Downstream of this reducer 22, two bearings are provided, namely a drained rolling bearing 28 the rolling elements of which are balls, and a rolling bearing 30 the rolling elements of which are rollers.

This last bearing 30 is optional, in that it is provided in some configurations to improve the dynamics of the low-pressure shaft 18. In any case, these two bearings 28, 30 are interposed between the fixed inner casing of the low-pressure compressor 6, and the front end of the low-pressure shaft 18.

Figure 2:
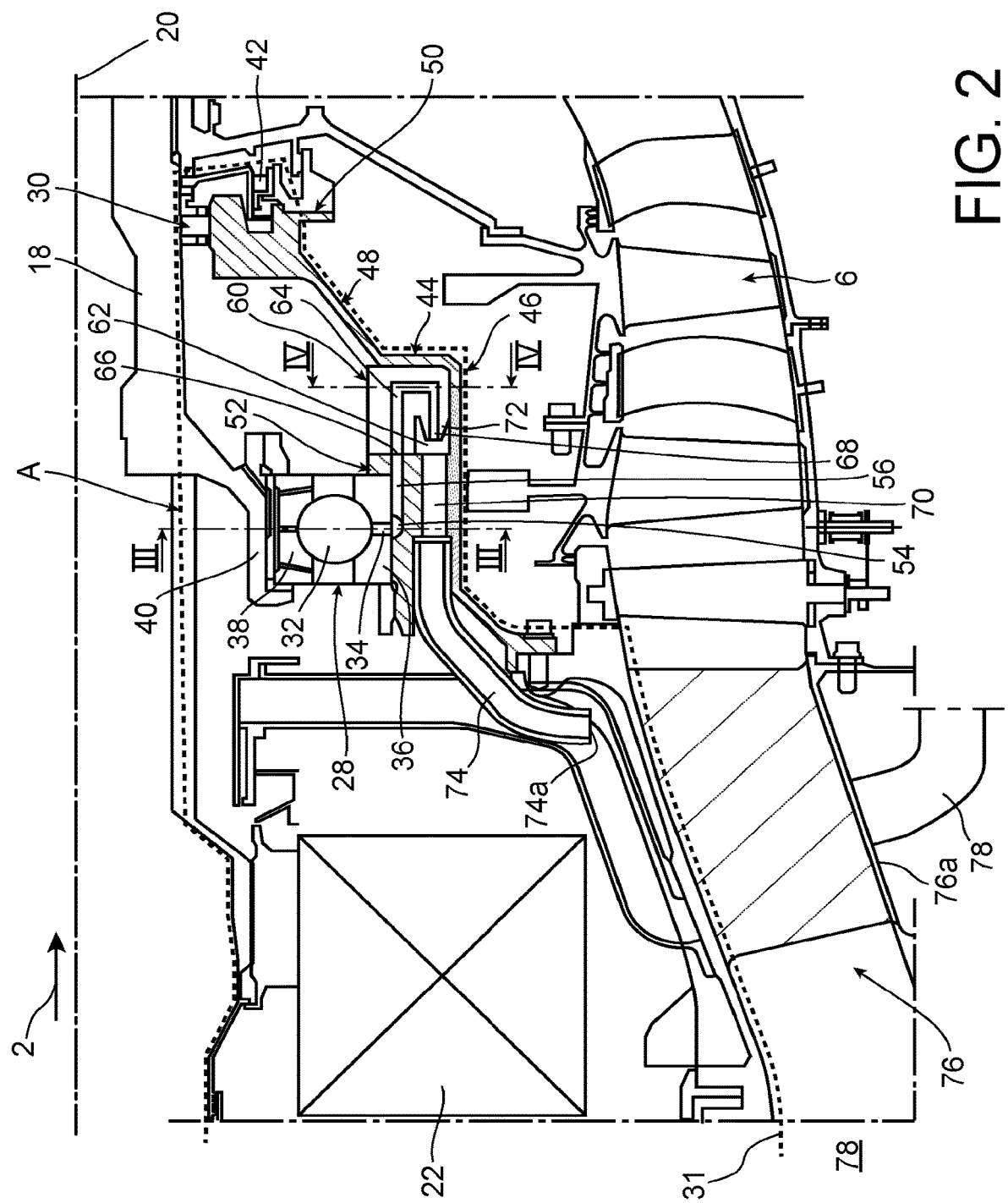
FIG. 2 represents a more detailed enlarged view of a lubricated enclosure forming integral part of the turbine engine shown in the previous figure.
Figure 3:
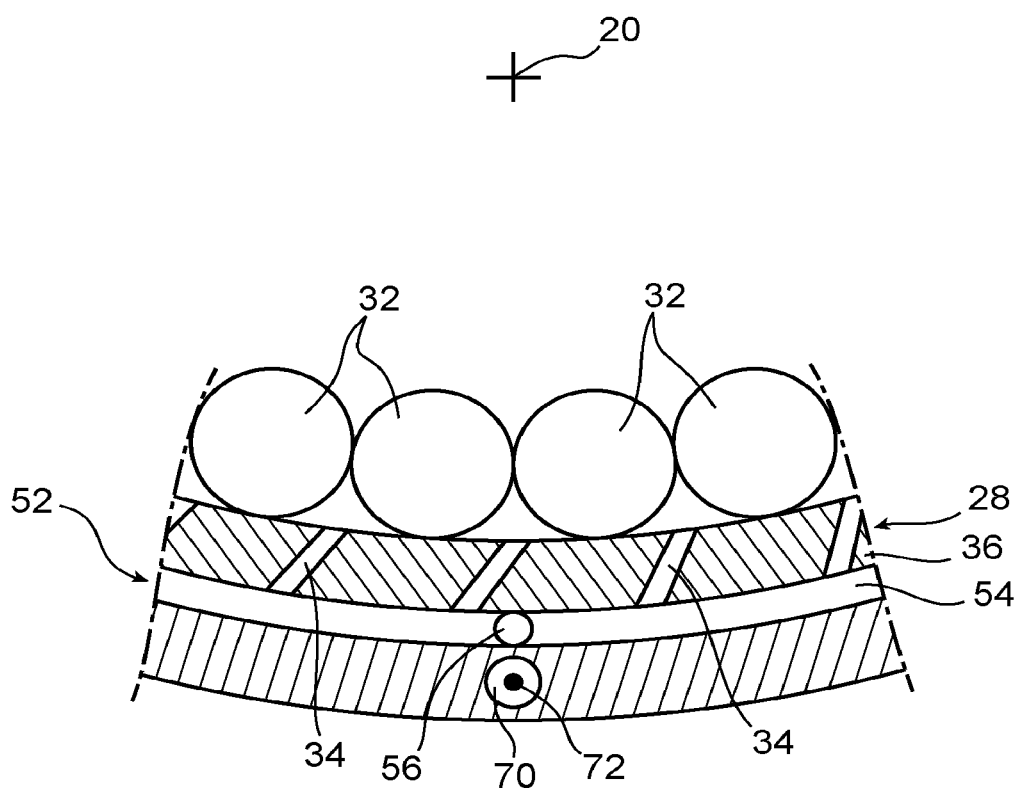
FIGS. 3 and 4 represent sectional views taken respectively along the lines III-III and IV-IV of FIG. 2.
Figure 4:
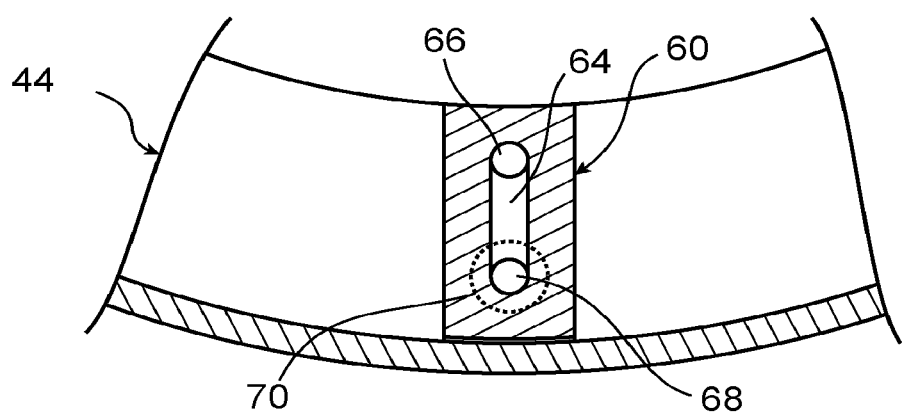

Referring now to FIGS. 2 to 4, there will be described in more detail the lubricated enclosure A, as well as the surrounding elements with which it cooperates. In FIG. 2, only the rear portion of the enclosure A has been represented. It is identified by the dotted line 30, which represents its outline. In this regard, it is noted that the longitudinal half-section shown in FIG. 2 corresponds to a section along a median vertical plane, so that the elements that are represented are those fitting into a 6 o'clock time position within the turbine engine.

Furthermore, still in this FIG. 2, the enclosure A is represented in a position such that it is adopted during the cruise phase of the aircraft, when the longitudinal axis 20 of the turbine engine, also corresponding to the longitudinal axis of the enclosure, is substantially horizontal. In other words, it is a position in which the turbine engine does not undergo a pitch angle.

As indicated above, the lubricated enclosure A comprises a drained ball 32 bearing 28. This bearing 28 is said to be "drained" because it includes drainage holes 34 distributed circumferentially all around an outer ring 36 of the bearing. The latter, of a design identical or similar to that described in document FR 2 740 187, also has an inner ring 38 carried by a pin 40 fixed on the low-pressure shaft 18.

For its part, the roller bearing 30 is located at a downstream end of the enclosure, in the vicinity of a segmented radial seal 42 closing this enclosure.

The enclosure A is also delimited radially outwards by a rolling bearing support 44, supporting not only the drained bearing 28 but also the roller bearing 30. The radially outer end of this bearing support 44 is fixed to the upstream by bolts to the stator portion of the low-pressure compressor 6. It then comprises, from upstream to downstream, a first support portion 46, a joining portion 48 and a second support portion 50. The support 44 is preferably made in one piece.

One of the features of the invention lies in the design of the first support portion 46, which will now be described in detail. First of all, this first support portion 46 comprises a lubricant manifold 52, made annularly and arranged all around the outer ring 36 of the bearing 28. The manifold, which is preferably made in one piece with the rest of the support 44, has a groove 54 centered on the axis 20 and closed by the outer surface of the outer ring 36.

Thus, the drainage holes 34 open into the annular groove 54. The manifold 52 also comprises a lubricant collection duct 56 at a time position close to 6 o'clock, preferably oriented in the direction of the longitudinal axis 20. Its upstream end opens into the groove 54, so that all the pressurized lubricant leaving the drainage holes 34 can join the collection duct 56. As for its downstream end, it is located axially opposite an ejector 60 at a time position close to 6 o'clock specific to the invention. Consequently, the manifold 52 fulfills the function of a device for communicating drainage holes 34 with the ejector 60.

Indeed, the ejector 60 takes the form of a cassette housed in a radial recess 62 defined by the bearing support 44, at its first support portion 46. The recess 62, open radially inwards and centered in a 6 o'clock time position, has an angular extent greater than that of the ejector cassette. Therefore, the lubricant can enter the recess 62 on either side of the cassette, also centered in a 6 o'clock time position.

The ejector 60 comprises a generally U-shaped primary duct 64, the first end of which is located in the downstream continuity of the collection duct 56. This first end corresponds to an inlet 66 of a primary flow intended to pass through the ejector 60. The other end of the duct 64 of the ejector 60 is constituted by an axially oriented outlet 68, like the inlet 66. For its part, this outlet 68 is located opposite an axially oriented lubricant discharge passage, this passage 70 also being made through the bearing support 44, as best seen in FIG. 2. More precisely, the discharge passage is located radially outwards with respect to the collection duct 56, these two elements 56, 70 being substantially superimposed in the 6 o'clock time position, so as to be traversed by the same transversal imaginary plane of the lubricated enclosure A.

In known manner, the outlet 68 is located at a nozzle 72 of the ejector 60, this nozzle being placed at the bottom of the recess 62, at the lowest point of the enclosure.

At the outlet of the discharge passage 70, that is to say at its upstream end, the first support portion 46 carries a lubricant discharge duct 74. This duct 74 is capable of conveying the lubricant coming from ejector 60 towards a radial arm of recovering the lubricant 76, arranged in a primary flow path 78 of the turbine engine. This radial arm 76 is arranged upstream of the low-pressure compressor 6, and the duct 74 has a lower end 74a which opens radially opposite this arm 76. It is noted that the radial arm 76 could be integrated with the bearing support 44, namely made in one piece with the latter. In addition, compared to the representation of FIG. 2, the lower end 74a of the duct 74 could be further radially away from the arm 76, so as not to project beyond the first support portion 46, in the radial direction outwards. Indeed, this configuration facilitates the axial mounting of the assembly formed by the parts 74, 46.

It is furthermore noted that, conventionally, the lower end 76a of this arm 76, arranged in a 6 o'clock time position, is connected to a lubricant recovery tube 78 intended to conduct the lubricant in the oil circuit, so that it can be reinjected into the enclosure A after being cooled and filtered.

Figure 5:
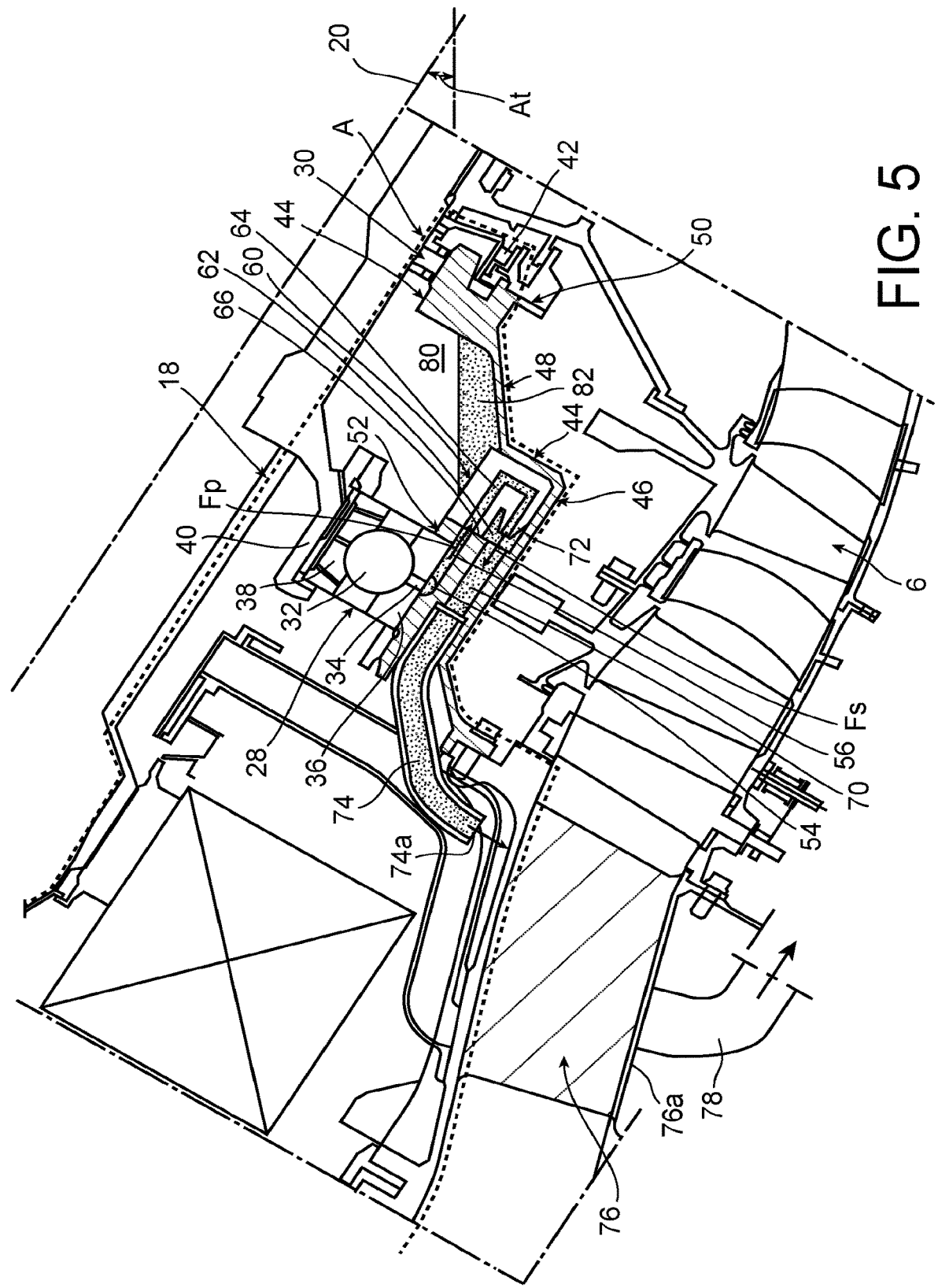
FIG. 5 is a view similar to that of FIG. 2, with the lubricated enclosure in the nose-up position.

In the cruise phase, the lubricant present in the enclosure A has no difficulty to be discharged by simple gravity, via the radial arm 76, then by the recovery tube 78. On the other hand, when in some flight phases, as on take-off, the turbine engine 1 presents a significant pitch angle, a lubricant retention area called critical area 80 is formed, shown in FIG. 5. In this figure showing the critical area 80 centered on the 6 o'clock time position, the pitch angle "At" resulting from the nose-up position of the aircraft is of the order of 30 to 40°. In this position, the critical area 80 is delimited between the first and second support portions 46, 50 of the bearing support 44, and the bottom of this area 80 is partially formed by the joining portion 48.

In this nose-up position, the lubricant 82, preferably oil, therefore tends to accumulate in the critical area 80 from which it cannot escape by gravity in the direction of the radial arm 76. The invention cleverly solves this problem thanks to the ejector 60, supplied by the primary flow Fp formed by the highly-pressurized lubricant coming from the drainage holes 34, and taking the collection duct 56. While passing through the nozzle 72, the primary flow causes a suction effect which allows driving inside the same nozzle 72 a secondary flow Fs, formed by the lubricant located around the nozzle of the ejector.

Thus, the circulation of the pressurized lubricant coming from the drained bearing 28 makes it possible to drive the lubricant 82, located in the recess 62 in the vicinity of the ejector, into the nozzle 72. Said ejector sprays the primary flow Fp and secondary flow Fs mixture through the discharge passage 70 and the discharge duct 74, allowing the lubricant to flow into the recovery arm 76. As an indication, the pressure of the mixture at the outlet of the nozzle can rise to about 6 bars.

Therefore, the lubricant 82 is prevented from stagnating and accumulating in the critical area 80, the oil level of which thus proves to be sufficiently low to protect the rotating elements of the enclosure, as well as the segmented radial seal 42 that should not be embedded to preserve its good functioning.

The invention thus proves to be particularly clever in that it takes advantage of the high lubricant pressure exiting the drained bearing 28, so as to supply the ejector 60 used for emptying the critical area 80, in particular in the nose-up position of the lubricated enclosure A.

Of course, various modifications can be added, by the person skilled in the art, to the invention which has just been described, solely by way of non-limiting examples.

The invention claimed is:

1. A lubricated enclosure for an aircraft turbine engine, the enclosure comprising:
    a drained rolling bearing provided with drainage holes;
    a lubricant ejector configured to limit the retention of lubricant in a critical area of the enclosure, said ejector being configured to be traversed by a primary lubricant flow in order to drive a secondary lubricant flow located around a nozzle of the ejector housed in said critical area of the enclosure; and
    a communication device for communicating the drainage holes with the ejector, so that the lubricant escaping from the drainage holes supplies the ejector in order to form the primary flow,
    wherein the secondary flow is sucked into the nozzle under effect of the primary lubricant flow flowing through the nozzle.

2. The lubricated enclosure according to claim 1, wherein the communication device is an annular lubricant manifold arranged around an outer ring of the rolling bearing, the manifold comprising a groove closed by the outer surface of the outer ring and into which the drainage holes open, said manifold also comprising at least one lubricant collection duct extending from the groove, said collection duct communicating with a primary flow inlet provided on the ejector, said duct being arranged in a 6 o'clock time position.

3. The lubricated enclosure according to claim 2, wherein the manifold is integrated with a rolling bearing support, carrying the outer ring of the bearing.

4. The lubricated enclosure according to claim 3, wherein the rolling bearing support is traversed by a lubricant discharge passage arranged opposite the nozzle of the ejector.

5. The lubricated enclosure according to claim 4, wherein the bearing support defines a radial recess in which the ejector is housed.

6. The lubricated enclosure according to claim 4, wherein the ejector comprises a generally U-shaped primary duct the primary flow inlet of which is opposite the lubricant collection duct, and an outlet of which is opposite the lubricant discharge passage.

7. The lubricated enclosure according to claim 3, wherein the bearing support also carries another bearing.

8. The lubricated enclosure according to claim 1, wherein a lubricant discharge duct extending from the ejector, said duct opening opposite a radial arm of recovering the lubricant passing through a primary flow path of the turbine engine, and arranged in a 6 o'clock time position.

9. The lubricated enclosure according to claim 1, wherein said critical area of the enclosure corresponds to a lubricant retention area formed when the turbine engine is inclined at a pitch angle, said critical area being centered in a 6 o'clock time position.

10. An aircraft turbine engine comprising at least one lubricated enclosure according to claim 1, the turbine engine comprising a fan driven by a reducer.

11. The lubricated enclosure according to claim 7, wherein the another bearing is a roller bearing.

* * * * *